United States Patent
Nickel et al.

(10) Patent No.: US 7,140,352 B2
(45) Date of Patent: Nov. 28, 2006

(54) METHOD FOR CONTROLLING AN ELECTROMAGNETIC VALVE IN A FUEL SYSTEM

(75) Inventors: Hans Nickel, Weissach (DE); Claus Naegele, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 11/406,393

(22) Filed: Apr. 19, 2006

(65) Prior Publication Data

US 2006/0243251 A1 Nov. 2, 2006

(30) Foreign Application Priority Data

Apr. 28, 2005 (DE) .................... 10 2005 019 762

(51) Int. Cl.
*F02M 7/23* (2006.01)
*F16K 31/02* (2006.01)
(52) U.S. Cl. ...................... 123/438; 123/435
(58) Field of Classification Search ............ 123/438, 123/435, 73 AD; 251/129.01, 129.15
See application file for complete search history.

(56) References Cited

U.S. PATENT DOCUMENTS 6,932,058 B1 * 8/2005 Nickel et al. ............... 123/438
2005/0168310 A1 8/2005 Nickel et al.

\* cited by examiner

*Primary Examiner*—Hai Huynh
(74) *Attorney, Agent, or Firm*—Walter Ottesen

(57) ABSTRACT

A method is for controlling the metering of fuel in a fuel system (30) of an internal combustion engine (1) which is to be started manually. This control is with a currentless open electromagnetic valve (21). The electromagnetic valve (21) is only switched into the closed state when a supply voltage ($U_v$) is applied and current flows. Within a blocking time (47), which is pregiven by an engine control (13), a supply voltage ($U_v$) is switched onto the excitation coil of the electromagnetic valve (21) only and the valve (21) is supplied with current only when an underpressure is present in the intake channel (11) of the fuel system (30); whereas, in the remaining time span (50) of the blocking time (47), wherein no underpressure is present, the control unit (20) switches off the supply voltage ($U_v$) and the valve (21) is in the currentless open state.

7 Claims, 4 Drawing Sheets

METHOD FOR CONTROLLING AN ELECTROMAGNETIC VALVE IN A FUEL SYSTEM

CROSS REFERENCE TO RELATED APPLICATION

This application claims priority of German patent application no. 10 2005 019 762.0, filed Apr. 28, 2005, the entire content of which is incorporated herein by reference.

FIELD OF THE INVENTION

The invention relates to a method for controlling the fuel metering in a fuel system of an internal combustion engine by means of an electromagnetic valve which is open when no current is applied thereto. The internal combustion engine is especially for internal combustion engines which are manually started.

BACKGROUND OF THE INVENTION

A valve of the above kind is disclosed in United States patent publication US 2005/0168310 A1. This valve is provided for application in a fuel system and is used to control the fuel flow in order to permit a control of the fuel metering in accordance with different operating parameters of the internal combustion engine.

The use of an electromagnetic valve of this kind in a fuel system is not easily possible for internal combustion engines in portable handheld work apparatus. This is so because work apparatus of this kind, as a rule, have internal combustion engines which are manually started and are operated and started without batteries. The electrical energy, which is available, is generated via an ignition generator which comprises an induction coil. The induction coil coacts with a magnet which rotates with the crankshaft. The energy is intermediately stored via a capacitor and is utilized to trigger an ignition spark via an engine control.

The control of a fuel system having an electromagnetic valve therefore requires additional energy which is made available by a corresponding larger design of the generator and energy store.

SUMMARY OF THE INVENTION

It is an object of the invention to provide a method for controlling an electromagnetic valve which makes possible a substantially free intervention into the fuel metering with a minimum energy requirement.

The method of the invention is for controlling the metering of fuel in a fuel system of an internal combustion engine having a crankshaft to which rotation is imparted during operation of the engine, the fuel system including: an intake channel wherein an underpressure develops; nozzle means opening into the intake channel; a fuel storage space; a fuel line between the fuel storage space and the nozzle means from which fuel can flow into the intake channel in response to an underpressure therein; an electromagnetic valve having an excitation coil and being mounted in the fuel line and being switchable between a first position wherein the valve is deenergized and open and a second position wherein the valve is energized and closed; an energy store for providing the energy needed to switch the electromagnetic valve into the second position thereof; a generator for supplying the energy store with energy when the crankshaft rotates; the electromagnetic valve being switchable into the second position only when a supply voltage ($U_v$) is applied to the excitation soil thereof; a control unit operatively connected to the electromagnetic valve; and, an engine control operatively connected to the control unit. The method includes the steps of: causing the engine control to switch the electromagnetic valve into the second position via the control unit in dependence upon operating parameters of the engine by applying the supply voltage ($U_v$) to the excitation coil in order to block a flow of fuel during a blocking time interval pregiven by the engine control whereby a discharge of fuel into the intake channel is essentially prevented; and, causing the control unit to switch the excitation coil onto the supply voltage ($U_v$) for a portion of the blocking time interval causing current to flow through the excitation coil only when the underpressure is present at the nozzle means; whereas, during the remainder of the blocking time interval during which no underpressure is present at the nozzle means, causing the control unit to switch off the supply voltage ($U_v$) whereby the electromagnetic valve is in the first position wherein the valve is deenergized and open.

The method of the invention is based on a currentless open valve, that is, a valve which, in the rest state, is open without application of a voltage. This means that, in the currentless open state, the fuel line, which is to be switched, is not mechanically blocked.

If a blocking time is pregiven by an engine control within which a fuel flow is to be prevented into the intake channel of the internal combustion engine, then the electromagnetic valve is controlled in accordance with the following criteria.

Two conditions must be satisfied to apply a supply voltage to the electromagnetic valve:

1. the engine control must have inputted a blocking time; and,
2. an underpressure must be present in the intake channel.

Only if these two conditions are satisfied is the valve supplied with current and mechanically blocks the fuel line of the fuel system so that a discharge of fuel at the nozzles into the intake channel is prevented.

If no underpressure is present in the intake channel during the pregiven blocking time, then a valve is switched to be without current notwithstanding the blocking time pregiven by the engine control; that is, the supply voltage for the excitation coil of the electromagnetic valve is interrupted. The valve drops back into the currentless open state whereby the fuel line is mechanically opened. Since no underpressure is present in the intake channel, no fuel enters into the intake channel at the nozzles and, for this reason, the fuel flow continues to be inhibited.

Notwithstanding the pregiven blocking time, the supply voltage to the electromagnetic valve is switched off by the control unit and, in this way, the physical pressure conditions in the intake channel, which are present in this time span, are used in order to fulfill the input of the engine control, namely, no fuel discharge into the intake channel is permitted.

Always when a fuel discharge from the nozzles into the intake channel is not physically possible, then the necessity is no longer present that the valve be held in the closed state. In this way, the electrical energy, which is necessary for the closed state of the valve, is not needed so that, as a result, electrical energy can be saved in considerable amounts without limiting functionality. For this reason, the application of an electromagnetic valve in the fuel system of internal combustion engines also becomes possible with low power generators as well as in internal combustion engines which have no batteries and are especially manually started. The method of the invention opens up the possibility to utilize electromagnetically controlled fuel systems in portable handheld work apparatus (such as motor-driven chain saws, brushcutters or the like) with simple configuration and low weight which is of significance in order to optimize fuel metering to also satisfy strict exhaust-gas values in two-stroke engines.

In a simple embodiment, the pressure at the nozzle in the intake channel is detected and is compared to a threshold value. During the blocking time, the supply voltage is only applied to the excitation coil of the electromagnetic valve when the pressure in the intake channel drops below a pregiven threshold value. If there is no drop below the pregiven threshold value in the intake channel, the valve is currentlessly held open during this time notwithstanding the pregiven blocking time.

In a simple manner, the threshold value corresponds to the ambient air pressure. It can also be practical to select the threshold value as a pressure value between the ambient air pressure and a minimum crankcase underpressure of the internal combustion engine.

Advantageously, the pressure value in the intake channel is detected via a sensor and is compared to the pregiven threshold value. In a similar manner, the instantaneous pressure in the crankcase can be detected via a sensor and compared to a pregiven threshold value.

It can also be practical to undertake the control of the valve within the blocking time without using pressure sensors. Because of the constructive characteristics in a slot-controlled two-stroke engine or four-stroke engine, the inlet is open in a fixedly pregiven crankshaft angular range. Only during this time is current to be supplied to the electromagnetic valve in a first approximation within a pregiven blocking time so that the fuel line is mechanically blocked in order to inhibit the discharge of fuel at the nozzles because of the existing underpressure. The valve can be held open outside of this crankshaft angular range within a pregiven blocking time so that the method of the invention can also be used without additional sensors.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
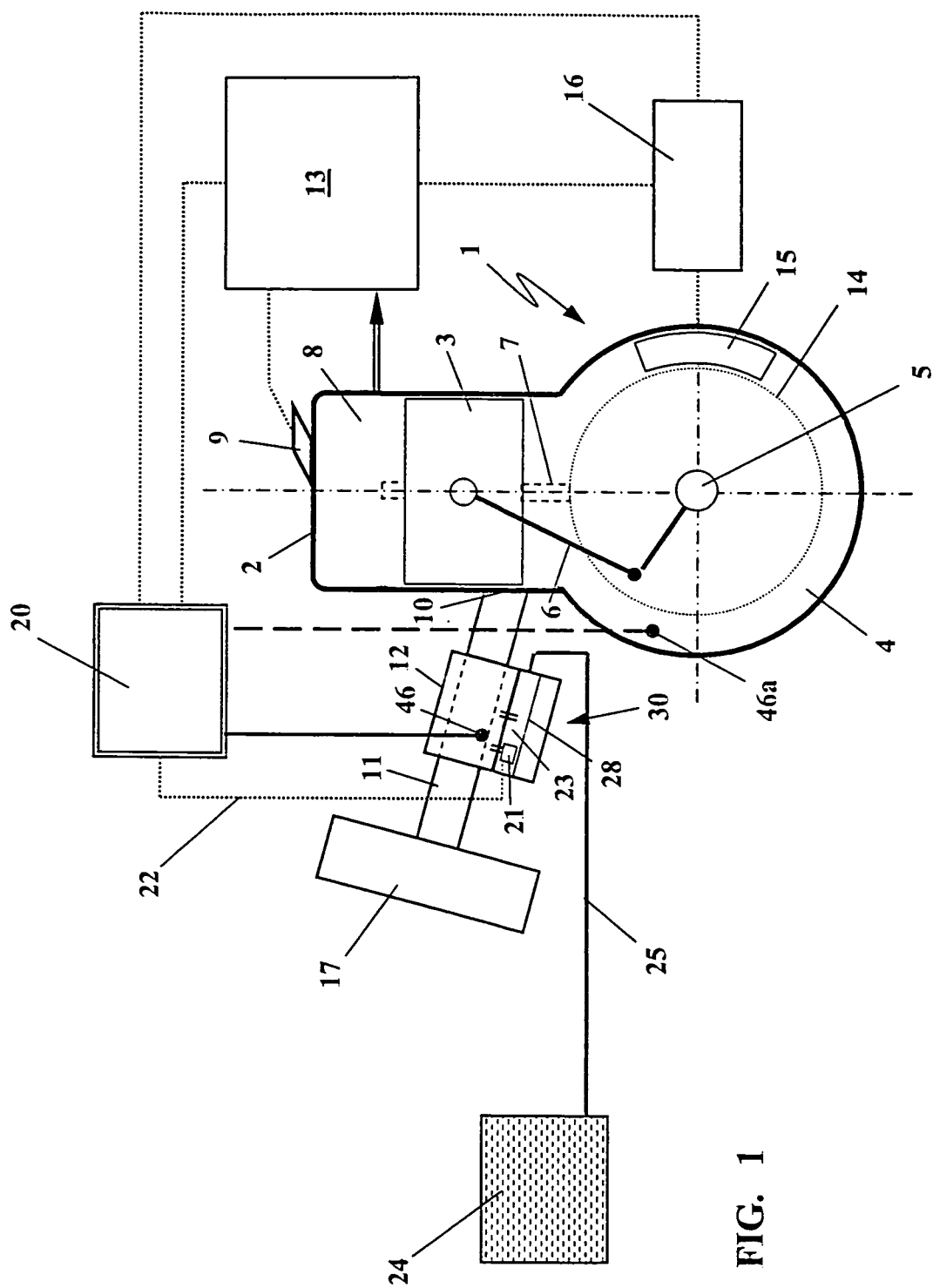
FIG. 1 is a schematic of an internal combustion engine having an intake channel and an ignition circuit.

In FIG. 1, reference numeral 1 identifies an internal combustion engine which, in the embodiment, is a two-stroke engine. The internal combustion engine 1 includes a cylinder 2 having a reciprocating piston 3 which rotatingly drives a crankshaft 5 journalled in the crankcase 4. For this purpose, the crankshaft 5 is connected to the piston 3 via a corresponding connecting rod 6.

The piston 3 controls a mixture inlet 10 which draws in combustion air via an intake channel 11 and an air filter 17 when there is an underpressure present in the crankcase 4. Fuel is admixed to the combustion air when passing through the carburetor 12. An air/fuel mixture is drawn by suction into the crankcase 4 via the mixture inlet 10 controlled by the piston 3 and is moved into the combustion chamber 8 via transfer channels 7 formed in the cylinder 2 with a downward movement of the piston. An ignition spark is triggered at a spark plug 9 via an ignition control 13. The spark plug 9 ignites the air/fuel mixture compressed in the combustion chamber 8 by the upward traveling piston and the piston drives the crankshaft 5 with its downward movement.

The crankshaft 5 drives a wheel 14 indicated in phantom outline. This wheel 14 can be a flywheel, a fan wheel or the like. A magnet is mounted in the wheel 14 and induces a voltage in a fixedly mounted coil 15 mounted at the periphery of the wheel 14. The voltage is intermediately stored in an energy store 16 which is preferably a capacitor or the like.

The energy store 16 supplies, on the one hand, the ignition control 13 and makes available the energy for the ignition spark at the spark plug 9. Furthermore, a control unit 20 is driven from the energy store and this control unit is provided for driving an electromagnetic valve 21. The valve 21 is provided in the fuel system 30 and functions to control the fuel metering. For this purpose, the electromagnetic valve 21 is connected to the control unit 20 via a control line 22.

Figure 2:
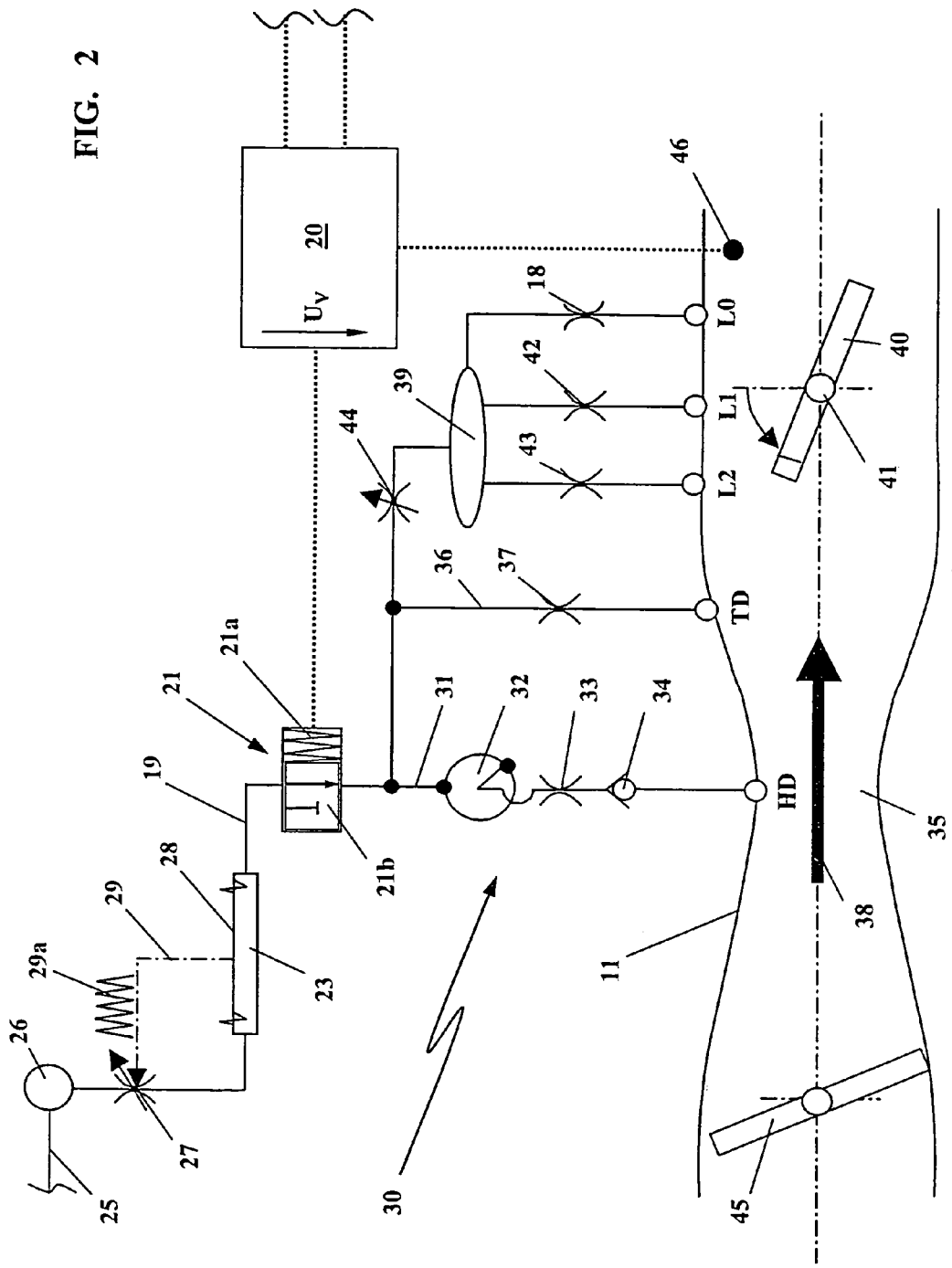
FIG. 2 is a schematic representation of a carburetor arrangement having an electromagnetically switchable valve.

The fuel system 30 includes the control chamber 23 of the carburetor 12 as well as a fuel tank 24 from which the control chamber 23 is fed. For this purpose and as shown in FIG. 2, a fuel pump 26 is mounted in the fuel feed line 25. The fuel pump is driven by the changing crankcase pressure (see FIG. 3) in the crankcase 4 of the internal combustion engine. The pressure end of the fuel pump 26 is connected via an inlet valve 27 to the control chamber 23 which is delimited by a membrane 28. The membrane 28, via a control lever 29, controls the inlet valve 27 against the force of a spring 29a.

A main nozzle HD and preferably a part-load nozzle TD and several idle nozzles LO, L1 and L2 branch into the intake channel 11 from the control chamber 23.

In the embodiment of FIG. 2, the valve 21 is mounted in the fuel line 19 between the control chamber 23 and the nozzles. The valve 21 is open in the currentless state as shown in FIG. 2. For example, a spring 21a functions for this purpose and biases the valve member 21b into the passthrough position. For closing the valve 21 and therefore for blocking the fuel metering, an excitation coil of the electromagnetic valve is charged with a supply voltage $U_v$ via a control unit 20. If the supply voltage $U_v$ is applied to the excitation coil of the valve 21, the valve member 21b is pulled back against the force of the spring 21a and the metering of fuel is blocked.

An adjusting element 32 as well as a throttle 33 lie in the main nozzle path 31. The main nozzle path 31 is connected to the main nozzle HD via a check valve 34 in the region of the venturi 35 of the intake channel 11.

Figure 5:
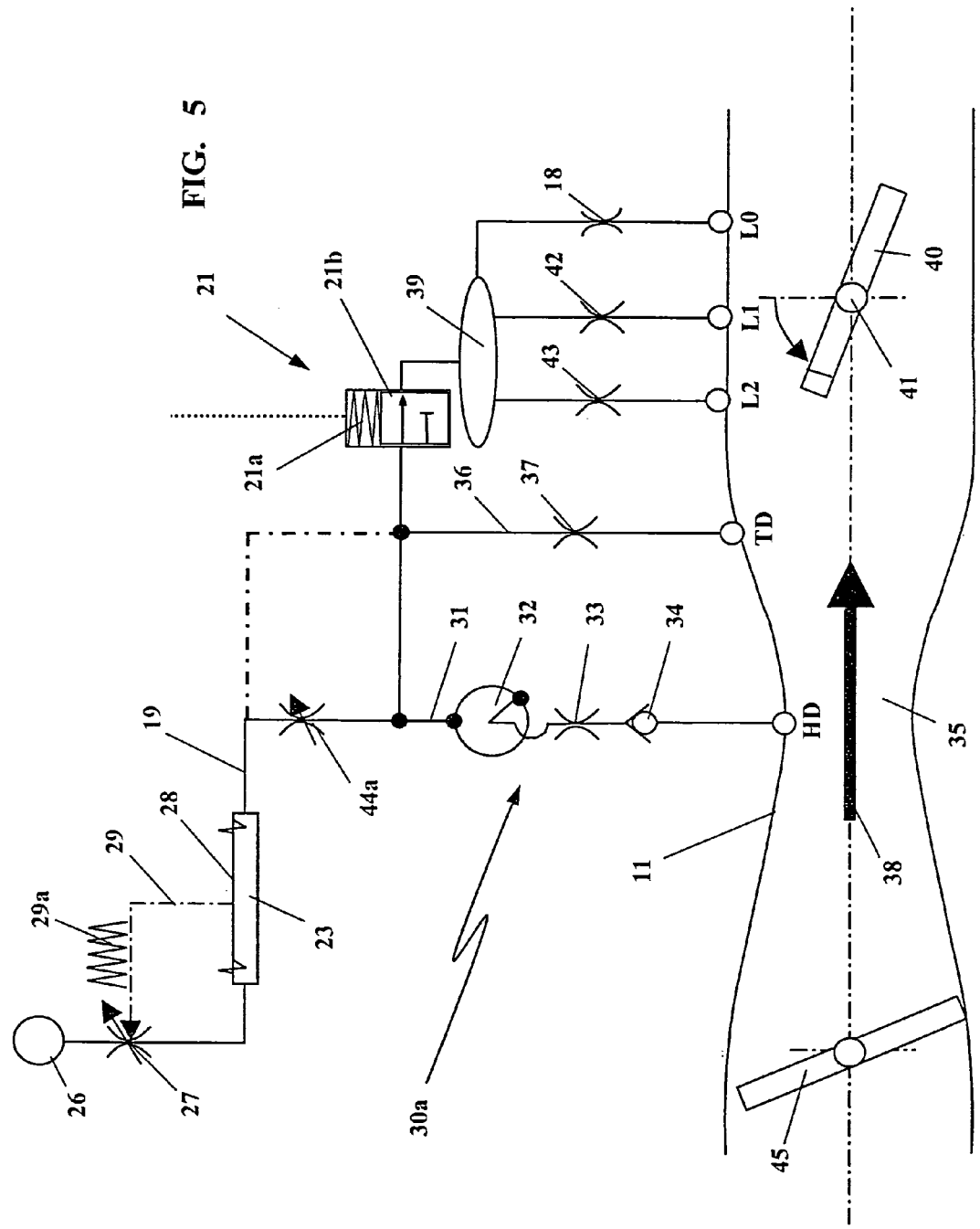

A part-load path 36 is provided parallel to the main nozzle path 31 and feeds the part-load nozzle TD via a fixed throttle 37. The part-load nozzle TD lies downstream of the venturi 35 in flow direction 38 at the elevation of the nozzle L1. In the schematics of FIGS. 2 and 5, the nozzles are shown one next to the other to provide a better overview.

A pivotable throttle flap 40 lies after the main nozzle HD in the intake channel 11 downstream of the venturi 35. In the pivot range of the throttle flap, the idle nozzles L1 and L2 open and the outlet nozzle LO opens downstream of the throttle flap 40. The idle nozzles LO, L1 and L2 are supplied, in common, from an idle chamber 39. The idle nozzle L1 lies approximately at the elevation of the axis 41 of the throttle flap 40 and is connected via a throttle 42 to the idle chamber 39.

The idle nozzle L2 opens upstream of the idle nozzle L1 into the intake channel 11 and is likewise connected to the idle chamber 39 via a throttle 43. The idle chamber 39 is connected via an idle adjusting screw 44 to the main nozzle path 31.

The idle nozzle LO opens downstream of the throttle flap 40 into the intake channel 11 and is connected via a throttle 18 to the idle chamber 39.

Upstream of the venturi 35, a choke flap 45 is mounted in the intake channel 11 and this choke flap is closed for a cold start of the engine in a manner known per se in order to enrich the mixture.

The assembly of the fuel system 30 with an electromagnetic valve 21 functions to provide a modified fuel metering in order to meter the fuel independently of the underpressure in the intake channel 11.

The energy, which is stored in the energy store 16, is, in principle, sufficient for the operation of the ignition of the internal combustion engine. If there is an intervention into the fuel system via the electromagnetic valve 21, additional energy is consumed and, for this reason, problems in the energy supply of the valve 21 can occur.

With the electromagnetic valve 21, the fuel metering can be blocked independently of the stroke position of the piston 3 in the engine and therefore independently of the crankshaft position.

In order to not consume too much energy by the control unit 20 during a blocking time 47 (FIGS. 3 and 4) of the fuel system 30, it is provided that the valve 21 is controlled in accordance with the method of the invention. Always when there is a command by the engine control 13 to close the valve 21, the control unit 20 monitors the pressure conditions in the intake channel 11 downstream of the throttle flap 40. The blocking time 47 is pregiven by the engine control 13. If, during this blocking time 47, the fuel line 19 is to be blocked via the control unit 20 and if the control unit 20 determines no underpressure in the intake channel 11 via a sensor 46 (contrary to the closing command of the engine control 13), the supply voltage $U_v$ is switched off so that no current flows and therefore no energy is consumed. The electromagnetic valve 21 is open when there is no current. For this reason, the valve member 21b is displaced under the force of the spring 21a and the fuel line 19 is switched open contrary to the command of the engine control 13. Since no underpressure is present in the intake channel 11, no fuel is, however, drawn by suction via the nozzles into the intake channel 11 so that the purpose of the close command, namely, to interrupt the metering of fuel into the intake channel, continues to be present.

If the command "block metering of fuel" continues and if the control unit 20 determines an underpressure in the intake channel 11, the excitation coil of the electromagnetic valve 21 is supplied with current anew so that the metering of fuel in the fuel system 30 is mechanically inhibited. The purpose of the command (to interrupt the metering of fuel during a pregiven blocking time 47) continues to be ensured.

Figure 3:
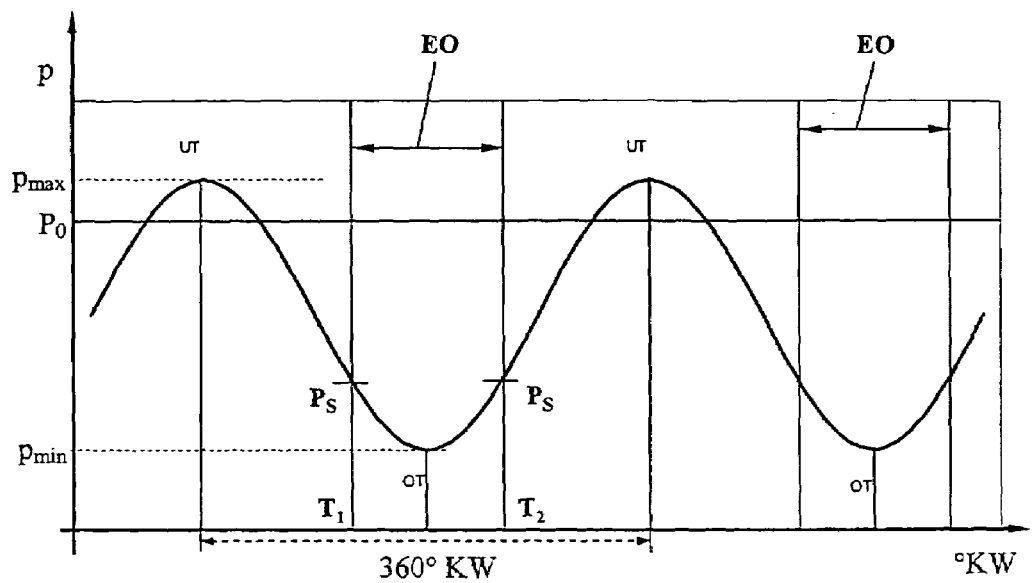
FIG. 3 is a graph showing the course of the pressure in the crankcase as a function of the crankshaft angle.
Figure 4:
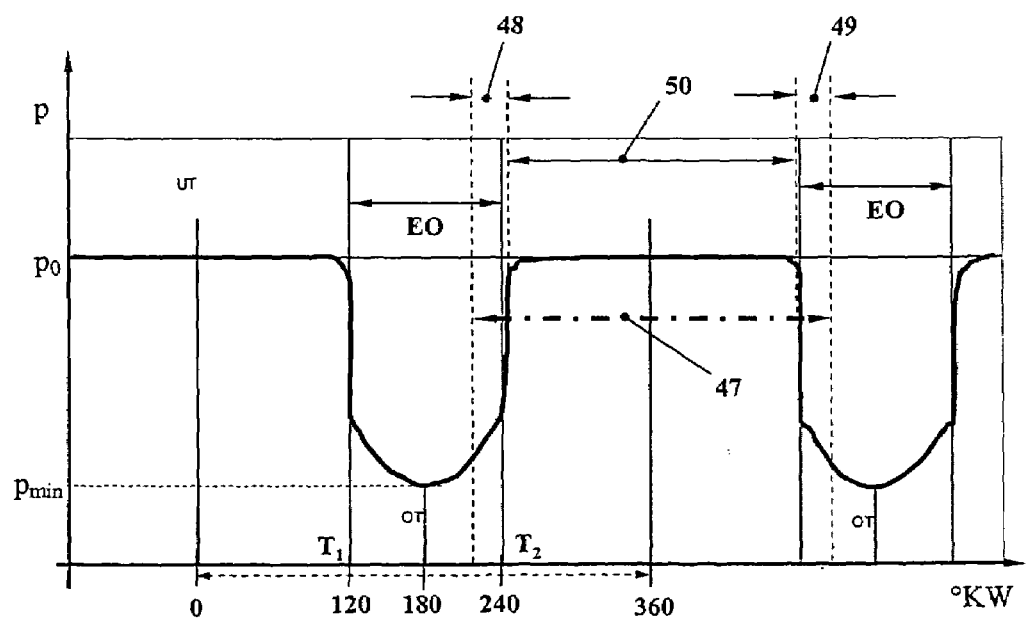
FIG. 4 shows the course of the pressure in the intake channel plotted as a function of the crankshaft angle; and, FIG. 5 is a schematic representation of a further embodiment of a carburetor arrangement having an electromagnetic valve switching the idle nozzles.

The principle of the method of the invention is explained in greater detail with respect to FIGS. 3 and 4. In FIG. 3, the changing crankcase pressure p in the crankcase 4 is plotted as a function of the crankshaft angle °KW. Starting at bottom dead center UT, the crankcase pressure $p_{max}$ drops to $p_{min}$ at top dead center OT of the piston 3 in order to again increase to $p_{max}$ up to the next bottom dead center UT. The distance on the X-axis between the two lower bottom dead centers UT corresponds precisely to one crankshaft revolution, that is, 360° crankshaft angle.

Because of the constructive configuration and position of the mixture inlet 10 relative to the piston 3, the mixture inlet is controlled by the piston 3 and this is also characterized as a slot control. Because of the constructive characteristics, the mixture inlet 10 can be open only in the range identified by EO as a function of the crankshaft angle. Only during this time is an underpressure present in the intake channel 11.

In FIG. 4, the pressure p in the intake channel is plotted as a function of crankshaft angle °KW. A time point $T_1$, the inlet is opened. Correspondingly, the underpressure present in the crankcase 4 is present in the intake channel 11. At time point $T_2$, the piston 3 closes the mixture inlet 10 so that the underpressure p corresponds again to the ambient air pressure $p_o$. Because of the constructive characteristics, an underpressure can be determined in the intake channel 11 only in the time spans EO.

If the electromagnetic valve 21 should now block the metering of fuel over a blocking time 47 to limit the metering of fuel, then an underpressure is present in the intake channel 11 only in the time spans 48 and 49 of the blocking time 47. In the remaining time span 50, an essentially ambient air pressure $p_o$ is present in the intake channel 11 so that during this time span 50, no fuel passes or is drawn by suction into the intake channel 11 because of the physical pressure conditions.

In accordance with the concept of the invention, it is provided that the electromagnetic valve 21 is supplied with current exclusively in the time spans 48 and 49, that is, exclusively in these time spans 48 and 49 of the blocking time 47 is the supply voltage $U_v$ to be applied. Only in these time spans 48 and 49 is energy therefore consumed while, in the remaining clearly larger time span 50 of the blocking time 47, the valve 21 is without current so that no energy is consumed. In this way, with minimum energy consumption, a fuel system is controlled with an electromagnetic valve 21 without energy stores with corresponding capacity generators for the energy supply having to be made available. With the method of the invention, also manually started internal combustion engines without batteries can be reliably operated.

The control unit 20 must determine the actual intake underpressure in the intake channel 11 in order to be able to control the electromagnetic valve 21 correspondingly. This can take place via sensors (46, 46a). The intake channel underpressure in the intake channel 11 can be directly determined via the sensor 46. In a control of this kind, the intake channel underpressure downstream of the throttle flap 40 can be determined and is compared to a threshold value, for example, to the ambient air pressure $p_o$. The supply voltage is applied during the blocking time to the excitation coil of the electromagnetic valve 21 if the intake channel underpressure drops below the pregiven threshold value, for example, the ambient air pressure $p_o$. If no underpressure is determined in the intake channel 11, the supply voltage $U_v$ is switched off so that the valve 21 can drop or fall back into its open state wherein no current flows. A fuel flow is then not possible because of the compensated ambient air pressure $p_o$.

Alternatively, it is possible to measure the crankcase pressure in the crankcase 4 by means of a sensor 46a and to pregive an underpressure value $p_s$ (FIG. 3) as a threshold value which lies between the maximum crankcase underpressure Pin and the ambient air pressure $p_o$. Always when there is a drop below the threshold value underpressure $p_s$, current is applied to the valve 21 during a pregiven blocking time 47. If the crankcase underpressure lies above the threshold value $p_s$, then the valve 21 is switched to be without current during a blocking time.

Because of the constructive characteristics, the mixture inlet 10 can only be opened in a fixed crankshaft angular range EO between the time points $T_1$ and $T_2$. For this reason, a control of the electromagnetic valve 21 via the control unit 20 is also possible in dependence upon the crankshaft angle. If the blocking time 47 lies in a crankshaft angular range outside of the inlet time EO, the electromagnetic valve 21 can be basically held open. Current is applied to valve 21 only at a crankshaft angle in the region of the inlet time insofar as the engine control 13 or the control unit 20 inputs a blocking time.

As shown in the embodiment of FIG. 5, the electromagnetic valve 21 can also be assigned to the idle system 30a, that is, the valve 21 can block the connection of the fuel system 30 to the idle chamber 39. Also in this manner, the idle richness can be adjusted. The mixture composition can be adjusted also in the case of idle with the circuitry of FIG. 2.

Because of the control of the electromagnetic valve 21 of the invention, a functionally reliable control is ensured also in the case of idle wherein only limited electric energy is available. There is sufficient energy available to block the metering of fuel also over a crankshaft revolution completely because the valve 21 is driven only during the open time of the inlet 10 and is otherwise held in the currentless open state wherein no energy is consumed. With this control, the mixture composition and the fuel flow at idle can be adapted as desired so that a stable idle control in accordance with operating parameters of the internal combustion engine is possible.

The idle system is shown in the embodiment of FIG. 5 as a dependent system, that is, the idle system is connected downstream of the main adjustment screw 44a. It can also be practical to connect the idle system ahead of the main adjusting screw 44a as shown in phantom outline.

It is understood that the foregoing description is that of the preferred embodiments of the invention and that various changes and modifications may be made thereto without departing from the spirit and scope of the invention as defined in the appended claims.

What is claimed is:

1. A method for controlling the metering of fuel in a fuel system of an internal combustion engine having a crankshaft to which rotation is imparted during operation of the engine, the fuel system including:

an intake channel wherein an underpressure develops;
nozzle means opening into the intake channel;
a fuel storage space;
a fuel line between the fuel storage space and the nozzle means from which fuel can flow into said intake channel in response to an underpressure therein;
an electromagnetic valve having an excitation coil and being mounted in the fuel line and being switchable between a first position wherein said valve is deenergized and open and a second position wherein said valve is energized and closed;
an energy store for providing the energy needed to switch the electromagnetic valve into the second position thereof;
a generator for supplying the energy store with energy when the crankshaft rotates;
said electromagnetic valve being switchable into said second position only when a supply voltage ($U_v$) is applied to said excitation coil thereof;
a control unit operatively connected to said electromagnetic valve; and,
an engine control operatively connected to the control unit;
the method comprising the steps of:
causing said engine control to switch said electromagnetic valve into said second position via said control unit in dependence upon operating parameters of said engine by applying said supply voltage ($U_v$) to said excitation coil in order to block a flow of fuel during a blocking time interval pregiven by said engine control whereby a discharge of fuel into said intake channel is essentially prevented; and,
causing said control unit to switch said excitation coil onto said supply voltage ($U_v$) for a portion of said blocking time interval causing current to flow through said excitation coil only when said underpressure is present at said nozzle means;
whereas, during the remainder of said blocking time interval during which no underpressure is present at said nozzle means, causing said control unit to switch off said supply voltage ($U_v$) whereby said electromagnetic valve is in said first position wherein said valve is deenergized and open.

2. The method of claim 1, comprising the further steps of:
detecting pressure (p) at said nozzle means and comparing said pressure (p) to a threshold value ($p_o$, $p_s$);
during said blocking time interval, applying said supply voltage ($U_v$) to said excitation coil when said pressure (p) drops below said threshold value ($p_o$, $p_s$); and,
during said blocking time interval, causing said valve to be in said first position when said underpressure (p) at said nozzle means exceeds said threshold value ($p_o$, $p_s$).

3. The method of claim 2, wherein the threshold value ($p_o$) is the ambient air pressure.

4. The method of claim 2, wherein the threshold value ($p_s$) is a pressure value in the range between the ambient pressure ($p_o$) and the minimum underpressure ($p_{min}$) in the crankcase of said engine.

5. The method of claim 2, comprising the further steps of:
detecting the pressure (p) in said intake channel; and,
comparing said pressure (p) to the pregiven threshold value ($p_o$).

6. The method of claim 2, comprising the further steps of:
detecting the pressure (p) in the crankcase of said engine; and,
comparing said pressure (p) to the threshold pressure ($p_s$).

7. The method of claim 1, wherein, during said blocking time interval, except for the inlet time (EO) of said intake channel into said crankcase, said valve is held in said first position.

* * * * *